(No Model.)
J. W. HYATT.
FILTER.
No. 293,745.  Patented Feb. 19, 1884.
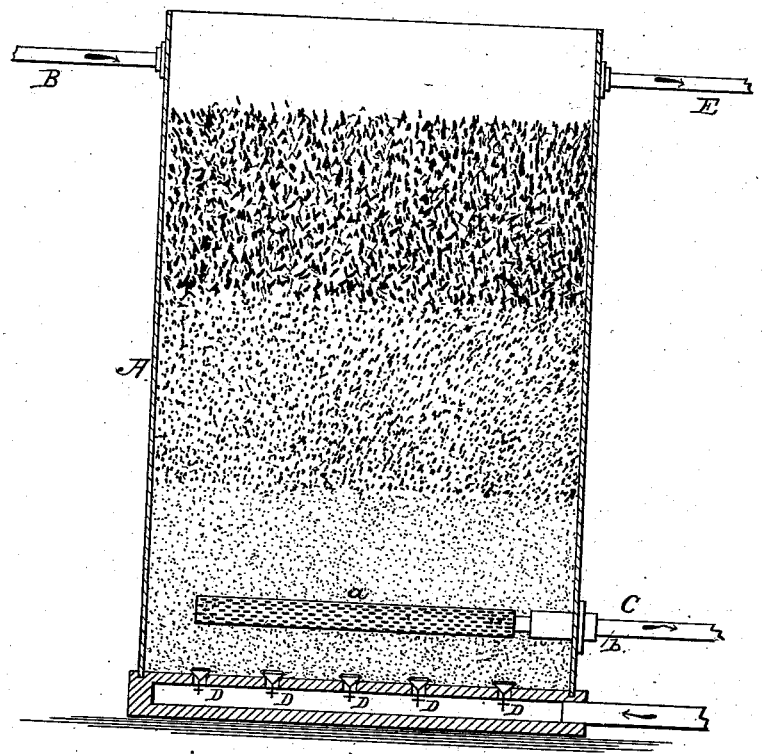
WITNESSES:
INVENTOR
John W. Hyatt
BY
Chas. C. Gill
ATTORNEY

UNITED STATES PATENT OFFICE.

JOHN W. HYATT, OF NEWARK, NEW JERSEY.

FILTER.

SPECIFICATION forming part of Letters Patent No. 293,745, dated February 19, 1884.

Application filed August 21, 1883. (No model.)

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

The invention relates to an improvement in filters; and it consists in a filter-bed composed of three or more layers or strata of material of varying specific gravity, the heavier material being adjacent to the outlet from the filter.

The purpose of the invention is to arrange in a single filter-bed layers of material (graduated as to the size and condition of their particles) to effect the best results, and which, when agitated, as in the process of washing the bed, will retain their proper relation to each other.

I have designed the employment of the bed in a filter such as that illustrated in section in the accompanying drawing; but I do not of course limit myself to any special form of filter, and merely refer to the apparatus shown in said application as a convenient means for utilizing the invention.

In the drawing, A denotes the shell of the apparatus, having an inlet, B, for the liquid to be filtered, a delivery, C, for the purified liquid, a series of automatically-operating check-valves, D, for the water used in washing the filter-bed, and a waste-outlet, E, for the escape of the impurities and water used in cleansing the bed.

The general construction and operation of the apparatus are similar to that shown and described in my Letters Patent of the United States No. 273,539, dated March 6, 1883, and in several applications now pending.

The delivery C consists of the perforated tube *a*, connecting with the escape-pipe *b*.

In the employment of the present invention in connection with the filter shown, I place upon the base of the filter a layer of fine material of superior specific gravity—such, for instance, as sulphate of baryta or emery in comminuted form—and upon this fine material I place a layer or stratum of material of medium specific gravity—such, for example, as sand or ground quartz—and upon this I introduce an additional layer of material which will be of light specific gravity, and preferably of coarser particles—such as ground coke which would pass through a sieve having a quarter of an inch mesh. The kind of material employed may vary according to the nature of the water to be filtered and other circumstances; but the relation of the different layers as to their specific gravity should be observed.

In the process of filtering by means of a bed of material arranged in the manner described, the coarse impurities will be arrested by the coarser elements of the bed, while the finer particles of foreign matter will pass through the said coarser elements and be detained by the finer layer or stratum of material. Thus in the employment of the bed described the larger particles of foreign matter will be arrested by the coke, the next finer grade by the sand or quartz, and the more minute particles by the sulphate of baryta or emery.

The effect of the employment of a filter-bed composed of material arranged as described as to quality and quantity of filtration will be readily understood by persons skilled in the art to which the invention relates. The retention of the larger particles of the impurities by the coarser elements of the bed and of the finer impurities by the more minute elements of the filtering medium operates to prevent the coarser impurities from quickly loading the finer elements, while at the same time the latter effectually arrests the more minute impurities. As a result the filter-bed will rapidly purify water, and will require less frequent washing than if the bed were composed entirely of elements of like nature.

After the process of filtering has been continued for a given length of time, the bed described will be washed and its particles separated sufficiently to permit the escape of the impurities by the water entering through the jet-valves D. During the washing of the filter-bed the particles thereof will become agitated in a limited degree, but not so much so that the layers of material will lose their proper relation to each other. The sulphate of baryta, being of superior specific gravity, will remain at the base of the filter during the washing process, while the sand or quartz, being of medium specific gravity, will retain a middle position, and the lighter material—such as coke—will remain at the top of the bed. Thus the relations of the material specified above will be preserved notwithstanding the agitation caused by the influx of the water used in washing the bed.

It will be readily understood that there can be no doubt as to the layers of material retaining their proper relation to each other when it is remembered that the specific gravity of sulphate of baryta is from 4.00 to 4.865, while sand has a specific gravity of from 1.392 to 1.800, and coke 1.000. Quartz has a specific gravity of 2.64 to 2.66.

What I claim as my invention, and desire to secure by Letters Patent, is—

1. In a vertical filter, a bed composed of layers of material of varying specific gravity, the layers being placed one directly upon another, and the heavier material being adjacent to the outlet, substantially as described.

2. A filter-bed consisting of comminuted sulphate of baryta, sand, and coke, or equivalent substances, the material being arranged in well-defined layers, one upon another, the baryta being at the bottom and the coke at the top, substantially as set forth.

Signed at New York, in the county of New York and State of New York, this 14th day of August, A. D. 1883.

JOHN W. HYATT.

Witnesses:
CHAS. C. GILL,
HERMAN GUSTOW.